(12) United States Patent
Stanescu et al.

(10) Patent No.: US 11,652,715 B1
(45) Date of Patent: May 16, 2023

(54) METHOD FOR DETECTING NETWORK MIS-CABLING

(71) Applicant: Lenovo Global Technology (United States) Inc., Morrisville, NC (US)

(72) Inventors: George-Andrei Stanescu, Ilfov (RO); Vlad Marian Spoiala, Bucharest (RO)

(73) Assignee: Lenovo Global Technology (United States) Inc., Morrisville, NC (US)

(*) Notice: Subject to any disclaimer, the term of this patent is extended or adjusted under 35 U.S.C. 154(b) by 0 days.

(21) Appl. No.: 17/957,802

(22) Filed: Sep. 30, 2022

(51) Int. Cl.
*H04L 69/40* (2022.01)
*H04L 43/08* (2022.01)
*H04L 43/065* (2022.01)
*H04L 43/12* (2022.01)

(52) U.S. Cl.
CPC ............ *H04L 43/08* (2013.01); *H04L 43/065* (2013.01); *H04L 43/12* (2013.01); *H04L 69/40* (2013.01)

(58) Field of Classification Search
CPC ....... H04L 43/08; H04L 43/065; H04L 43/12; H04L 69/40
See application file for complete search history.

(56) References Cited

U.S. PATENT DOCUMENTS

| | | | |
|---|---|---|---|
| 9,569,940 B2 | 2/2017 | Cudak et al. | |
| 2013/0336165 A1* | 12/2013 | Wakumoto | H04L 41/12 370/255 |
| 2016/0132532 A1* | 5/2016 | German | G06Q 10/063118 340/687 |
| 2016/0351025 A1* | 12/2016 | Cudak | G08B 5/38 |

* cited by examiner

*Primary Examiner* — Kostas J Katsikis
(74) *Attorney, Agent, or Firm* — Kunzler Bean & Adamson; Bruce R. Needham (57) ABSTRACT

A method for detecting network mis-cabling includes receiving, from a discovery process, an original remote device identifier ("ID") and remote port ID of a port of a remote device connected to a port of a local device and storing the original remote device ID and remote port ID together with a local device ID and a local port ID of the port of the local device. The method includes receiving, from the discovery process, a new remote device ID and remote port ID for a remote device connected to the port of the local device, and comparing the original remote device ID and port ID with the new remote device ID and remote port ID. The method includes, in response to the original remote device ID and the original remote port ID not matching the new remote device ID and the new remote port ID, sending a mismatch alarm.

20 Claims, 5 Drawing Sheets

METHOD FOR DETECTING NETWORK MIS-CABLING

FIELD

The subject matter disclosed herein relates to network cabling and more particularly relates to detecting network mis-cabling.

BACKGROUND

Incorrectly connected cables, when a person is thinking that the cables lead to certain devices/ports when in fact the other ends are connected to some other devices/ports, is an issue that could frequently occur in a datacenter, especially in a development datacenter where the network topologies are either quickly evolving over time or need to be changed frequently to do various testing. This problem may also occur in production environments, for example whenever the network topology needs to be changed to accommodate new additions to the datacenter. When such a mis-cabling issue occurs, it is often important for it to be detected as soon as possible, to reduce the downtime or other side effects (packet storms, security breaches and so on).

A common task for an engineer or maintenance personnel is to temporarily unplug network cables in order to re-route them or to have easier access to some devices. Once the maintenance operations are completed, the problem is to re-plug the cables into the right ports. It is often difficult for a human to remember from where these cables were unplugged (which network card/switch, which port on this card/switch) to reconnect them correctly.

BRIEF SUMMARY

A method for detecting network mis-cabling includes receiving, from a discovery process using a discovery protocol, an original remote device identifier ("ID") and an original remote port ID of a port of a remote device connected to a port of a local device and storing the original remote device ID and the original remote port ID together with a local device ID and a local port ID of the port of the local device. The method includes receiving, from the discovery process, a new remote device ID and a new remote port ID for a remote device connected to the port of the local device, and comparing the original remote device ID and the original remote port ID with the new remote device ID and the new remote port ID. The method includes, in response to the original remote device ID and the original remote port ID not matching the new remote device ID and the new remote port ID, sending a mismatch alarm.

An apparatus for detecting network mis-cabling includes a processor and non-transitory computer readable storage media storing code. The code is executable by the processor to perform operations that include receiving, from a discovery process implemented using a discovery protocol, an original remote device ID and an original remote port ID of a port of a remote device connected to a port of a local device and storing the original remote device ID and the original remote port ID together with a local device ID and a local port ID of the port of the local device. The operations include receiving, from the discovery process, a new remote device ID and a new remote port ID for a remote device connected to the port of the local device, comparing the original remote device ID and the original remote port ID with the new remote device ID and the new remote port ID, and in response to the original remote device ID and the original remote port ID not matching the new remote device ID and the new remote port ID, sending a mismatch alarm.

A program product for detecting network mis-cabling includes a non-transitory computer readable storage medium storing code. The code is configured to be executable by a processor to perform operations that include receiving, from a discovery process implemented using discovery process, an original remote device ID and an original remote port ID of a port of a remote device connected to a port of a local device, and storing the original remote device ID and the original remote port ID together with a local device ID and a local port ID of the port of the local device. The operations include receiving, from the discovery process, a new remote device ID and a new remote port ID for a remote device connected to the port of the local device, comparing the original remote device ID and the original remote port ID with the new remote device ID and the new remote port ID, and in response to the original remote device ID and the original remote port ID not matching the new remote device ID and the new remote port ID, sending a mismatch alarm.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for detecting network mis-cabling includes receiving, from a discovery process using a discovery protocol, an original remote device identifier ("ID") and an original remote port ID of a port of a remote device connected to a port of a local device and storing the original remote device ID and the original remote port ID together with a local device ID and a local port ID of the port of the local device. The method includes receiving, from the discovery process, a new remote device ID and a new remote port ID for a remote device connected to the port of the local device, and comparing the original remote device ID and the original remote port ID with the new remote device ID and the new remote port ID. The method includes, in response to the original remote device ID and the original remote port ID not matching the new remote device ID and the new remote port ID, sending a mismatch alarm.

In some embodiments, the method includes, on a periodic basis receiving, from the discovery process, a new remote device ID and a new remote port ID for a remote device connected to the port of the local device, comparing the original remote device ID and the original remote port ID with the new remote device ID and the new remote port ID, and in response to determining that the original remote device ID and the original remote port ID not matching the new remote device ID and the new remote port ID, sending a mismatch alarm. In other embodiments, storing the original remote device ID and the original remote port ID together with a local device ID and a local port ID of the port of the local device is in response to determining that a remote device ID and a remote port ID is not stored for the local device ID and the local port ID of the port of the local device. In further embodiments, storing the original remote device ID and the original remote port ID together with a local device ID and a local port ID of the port of the local device is in response to determining that storage of a remote device ID and corresponding remote port for the port of the local device is enabled.

In some embodiments, the method includes initiating an action in response to the mismatch alarm. In other embodiments, the action includes disabling one or more of the local port and the remote port. In other embodiments, the method includes reverting an action taken previously in response to determining that the original remote device ID and the original remote port ID match the new remote device ID and the new remote port ID. In other embodiments, the method includes clearing storage of the original remote device ID and the original remote port ID together with a local device ID and a local port ID of the port of the local device in response to disabling storage of a remote device ID and corresponding remote port ID for the port of the local device. In other embodiments, the discovery process includes a link layer discovery protocol ("LLDP"). In other embodiments, the original remote device ID, the new remote device ID and the local device ID each include a chassis ID type, length, and value ("TLV"). In other embodiments, the original remote port ID, the new remote port ID and the local port ID each include a port ID TLV.

An apparatus for detecting network mis-cabling includes a processor and non-transitory computer readable storage media storing code. The code is executable by the processor to perform operations that include receiving, from a discovery process implemented using a discovery protocol, an original remote device ID and an original remote port ID of a port of a remote device connected to a port of a local device and storing the original remote device ID and the original remote port ID together with a local device ID and a local port ID of the port of the local device. The operations include receiving, from the discovery process, a new remote device ID and a new remote port ID for a remote device connected to the port of the local device, comparing the original remote device ID and the original remote port ID with the new remote device ID and the new remote port ID, and in response to the original remote device ID and the original remote port ID not matching the new remote device ID and the new remote port ID, sending a mismatch alarm.

In some embodiments, the operations include, on a periodic basis, receiving, from the discovery process, a new remote device ID and a new remote port ID for a remote device connected to the port of the local device, comparing the original remote device ID and the original remote port ID with the new remote device ID and the new remote port ID, and in response to determining that the original remote device ID and the original remote port ID not matching the new remote device ID and the new remote port ID, sending a mismatch alarm. In other embodiments, storing the original remote device ID and the original remote port ID together with a local device ID and a local port ID of the port of the local device is in response to determining that a remote device ID and a remote port ID is not stored for the local device ID and the local port ID of the port of the local device.

In some embodiments, the operations include initiating an action in response to the mismatch alarm. In other embodiments, the operations include reverting an action taken previously in response to determining that the original remote device ID and the original remote port ID match the new remote device ID and the new remote port ID. In other embodiments, the discovery process is LLDP. In other embodiments, the original remote device ID, the new remote device ID and the local device ID each include a chassis ID TLV. In other embodiments, the original remote port ID, the new remote port ID and the local port ID each include a port ID TLV.

A program product for detecting network mis-cabling includes a non-transitory computer readable storage medium storing code. The code is configured to be executable by a processor to perform operations that include receiving, from a discovery process implemented using discovery process, an original remote device ID and an original remote port ID of a port of a remote device connected to a port of a local device, and storing the original remote device ID and the original remote port ID together with a local device ID and a local port ID of the port of the local device. The operations include receiving, from the discovery process, a new remote device ID and a new remote port ID for a remote device connected to the port of the local device, comparing the original remote device ID and the original remote port ID with the new remote device ID and the new remote port ID, and in response to the original remote device ID and the original remote port ID not matching the new remote device ID and the new remote port ID, sending a mismatch alarm.

In some embodiments, the operations include, on a periodic basis, receiving, from the discovery process, a new remote device ID and a new remote port ID for a remote device connected to the port of the local device, comparing the original remote device ID and the original remote port ID with the new remote device ID and the new remote port ID, and in response to determining that the original remote device ID and the original remote port ID not matching the new remote device ID and the new remote port ID, sending a mismatch alarm. In other embodiments, storing the original remote device ID and the original remote port ID together with a local device ID and a local port ID of the port of the local device is in response to determining that a remote device ID and a remote port ID is not stored for the local device ID and the local port ID of the port of the local device. In other embodiments, the operations include initiating an action in response to the mismatch alarm. In other embodiments, the operations include reverting an action taken previously in response to determining that the original remote device ID and the original remote port ID match the new remote device ID and the new remote port ID.

Figure 1:
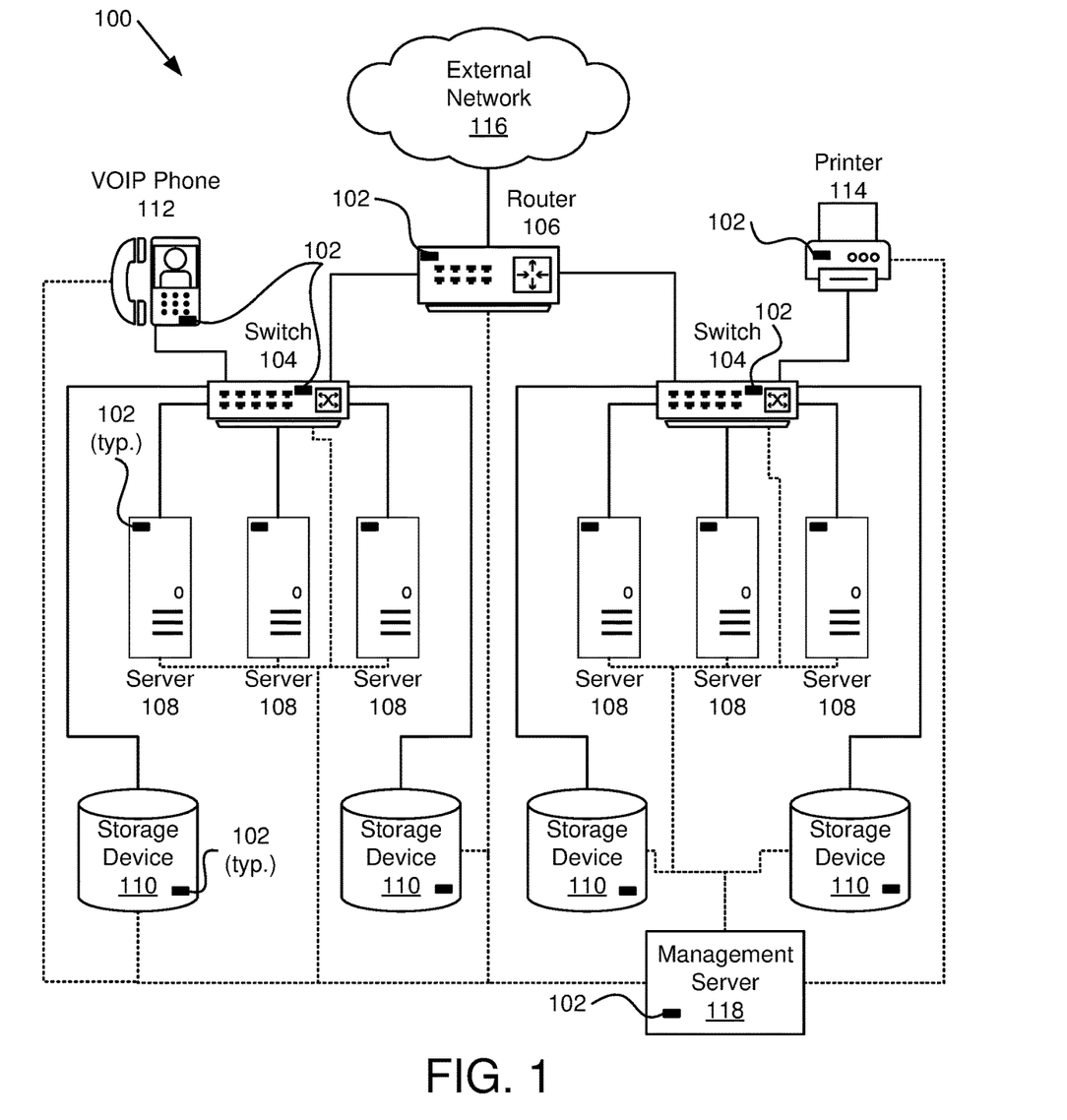
FIG. 1 is a schematic block diagram illustrating a system for detecting network mis-cabling, according to various embodiments.

FIG. 1 is a schematic block diagram illustrating a system 100 for detecting network mis-cabling, according to various embodiments. The system 100 includes a connection testing apparatus 102 in switches 104 and a router 106, and includes servers 108, storage devices 110, a voice-over-Internet Protocol ("VOIP") phone 112, a printer 114 within a local area network ("LAN"), an external network 116, and a management server 118, which are described below.

The connection testing apparatus 102 receives, from a discovery process implemented using a discovery protocol, information from various devices on the LAN, such as from a server 108, from a storage device 110, from a VOIP phone 112, from a printer 114, from another switch 104, from a router 106, or the like. The connection testing apparatus 102 stores information from a remote computing device connected to a local device at a particular port of the local device with a network cable. The information stored includes a device ID and a port ID for the remote device and corresponding device ID and port ID for the local device. The remote device advertises the remote device ID and port ID using the discovery process on a periodic basis.

The connection testing apparatus 102 compares a newly received device ID and port ID of the remote device that is currently connected to the port of the local device with the previously stored (e.g., original) device ID and port ID of the remote device. If one or both of the new remote device ID and new remote port ID does not match the previously stored original remote device ID and original remoted port ID, the connection testing apparatus 102 sends a mismatch alarm. In some embodiments, the connection testing apparatus 102 or other part of the system 100 takes action based on the mismatch alarm, such as disabling the port of the local device and possibly the port of the remote device. Typically, the connection testing apparatus 102 has access to the local port but may also have access to the remote port when the connection testing apparatus 102 is part of or is in communication with a management server 118. The connection testing apparatus 102 is described in more detail with regard to the apparatuses 200, 300 of FIGS. 2 and 3.

Often a LAN will employ a discovery process and various devices on the LAN send out packets of information about the device sending the packet. A discovery protocol commonly used currently is the Link Layer Discovery Protocol ("LLDP"), which enables various computing devices on a network to send out one or more packets of information about the computing devices. In some examples, a remote device, such as a server 108, periodically sends out a discovery packet of a particular format and a local device connected to the server 108, such as a switch 104, at a particular port of the local device receives the discovery packet. Traditionally, the local device stores information from the discovery packet in volatile memory, such as random-access memory ("RAM"). The connection testing apparatus 102 stores at least a remote device ID and a remote port ID with a local device ID and a local port ID in non-volatile memory.

LLDP is a vendor independent link layer discovery protocol used within networks by devices for advertising identity and capabilities to neighboring devices on a LAN segment. LLDP is a one-way protocol with periodic transmissions of a discovery packet. A default retransmission rate is 30 seconds. If information on a particular LAN segment changes, for example by plugging a cable in a wrong spot or replacing the remote device, the connection testing apparatus 102 will detect the change and send out an alarm and possibly take action. For LLDP, a discovery packet is in the form of an Ethernet frame where each frame contains one LLDP Data Unit ("LLDPDU"). Each LLDPDU is a sequence of type-length-value ("TLV") structures. Mandatory TLVs include a chassis ID, a port ID, and a time-to-live ("TTL") and then an end of LLDPDU TLV after some optional TLVs. As used herein, a device ID is a chassis ID for LLDP and other protocols returning a chassis ID. In other embodiments, another discovery protocol is used, such as a successor to LLDP, Cisco Discovery Protocol, Foundry Discovery Protocol, Nortel Discovery Protocol, Link Layer Topology Discovery, and the like.

The switches 104 are network switches that receive data packets and send the received data packets to a specified computing device. In other embodiments, the LAN includes hubs instead of switches 104. While the switches 104 are depicted as both being connected to a router 106, other embodiments where the connection testing apparatus 102 is applicable include other topologies with other ways to connect switches, including topologies with redundant connections.

The system 100 includes a router 106 that is a gateway device to an external network 116, which may include the Internet, a wide area network ("WAN"), another LAN, a fiber network, a cellular network, a wireless connection, other data network type, or any combination of networks. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT-F® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The LAN that includes the switches 104, router 106, servers 108, etc. is depicted with connections between components of the LAN. In some embodiments, the LAN may also include a wireless connection or other connection types. The connection testing apparatus 102 is useful for the LAN or other network with a discovery process using a protocol that enables computing devices to advertise a device ID, a port ID, or other pertinent information. The connection testing apparatus 102 is depicted in the switches 104, router 106, servers 108, storage devices 110, VOIP phone 112, and printer 114 in the system 100 of FIG. 1. In other embodiments, the connection testing apparatus 102 is located in other computing devices of the system 100. In some embodiments, the connection testing apparatus 102 is located centrally and communicates with the devices 104-114 of the system 100. A remote device includes any of the computing devices 104-114 depicted in the system 100 where the remote device sends discovery packets. In addition, a local device also includes any of the computing devices 104-114 depicted in the system 100 where the local device receives discovery packets. The remote device and local device may also switch roles.

In some embodiments, the system 100 includes a management server 118 connected to the various devices 104-114 and the management server 118 includes all or a portion of the connection testing apparatus 102. The management server 118, in some embodiments, is connected to a management controller in some or all of the computing devices 104-114 of the system 100. In some examples, the management controller in the computing devices 104-114 is a Lenovo® XClarity® Controller ("XCC") and the management server 118 is a Lenovo XClarity Administrator ("XCA") or a Lenovo XClarity Orchestrator ("XCO"). In other embodiments, the management controller in each device 104-114 is a baseboard management controller ("BMC") or other similar controller.

In some embodiments, the management server 118 controls, manages, etc. the connection testing apparatus 102. In some examples, the management server 118 includes a database with device IDs and corresponding port IDs for the various local and remote devices and compares new and original device IDs and port IDs, sends appropriate mismatch alarms, and/or takes appropriate actions. In other examples, the management server 118 manages one or more databases in the system 100 that store device IDs and corresponding port IDs and controls comparison of the new and original device IDs and port IDs, sending appropriate mismatch alarms, and/or taking appropriate actions.

The system 100 includes servers 108, which include rack-mounted servers, desktop computers, mainframe computers, or any other computer in a LAN functioning as a server 108. In other embodiments, the system 100 includes other computers that include or can benefit from a connection testing apparatus 102. The computers may include workstations, laptop computers, tablet computers, or the like. The system 100 includes storage devices 110 with non-volatile storage. In some embodiments, the storage devices 110 are in a storage area network ("SAN"). In other embodiments, the storage devices 110 are rack mounted. The system 100 may include other types of storage devices independent from other computing devices that advertise information and capabilities using a discovery protocol.

The system 100 may also include VOIP phones 112 connected to the LAN that advertise information and capabilities using a discovery protocol. The VOIP phones 112, in some embodiments, are viewed as another computing device on the LAN. The system 100 may also include one or more printers 114, which connect to the LAN and are capable of advertising information and capabilities using a discovery protocol. Other equipment may also be included in the system 100 that is capable of advertising information and capabilities using a discovery protocol.

Figure 2:
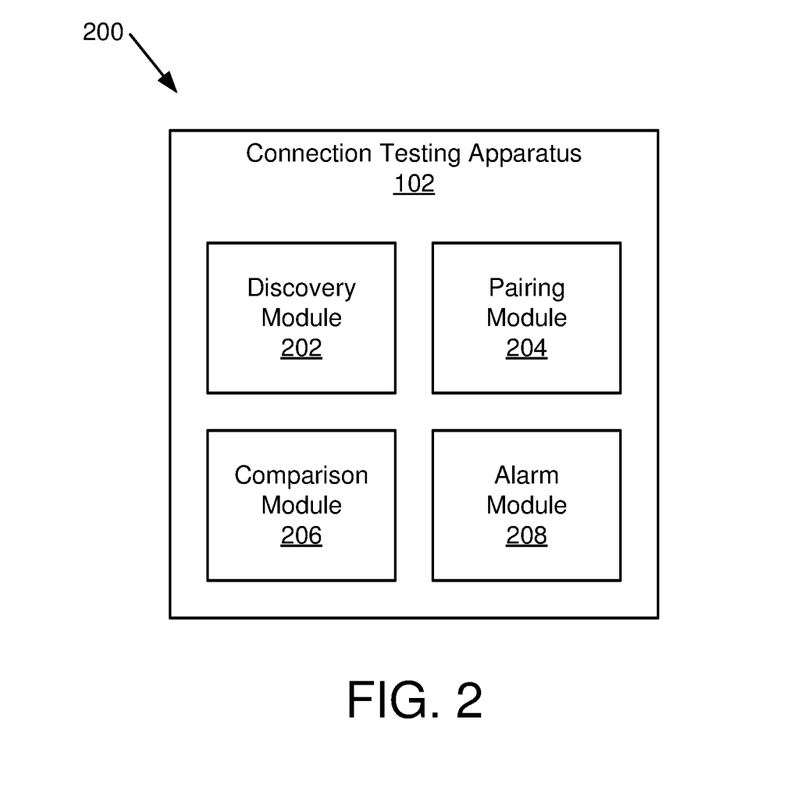
FIG. 2 is a schematic block diagram illustrating an apparatus for detecting network mis-cabling, according to various embodiments.

FIG. 2 is a schematic block diagram illustrating an apparatus 200 for detecting network mis-cabling, according to various embodiments. The apparatus 200 includes a connection testing apparatus 102 with a discovery module 202, a pairing module 204, a comparison module 206, and/or an alarm module 208, which are described below. In some embodiments, all or a portion of the apparatus 200 is implemented with executable code stored on computer readable storage media. In other embodiments, all or a portion of the apparatus 200 is implemented with a programmable hardware device, such as an application specific integrated circuit ("ASIC"), an FPGA, or the like. In other embodiments, at least a portion of the apparatus 200 is implemented using hardware circuits. In other embodiments, the apparatus 200 is implemented with executable code, a programmable hardware device, and/or hardware circuits.

The apparatus 200 includes, in some embodiments, a discovery module 202 configured to receive, from a discovery process implemented using a discovery protocol, an original remote device identifier ID and an original remote port ID of a port of a remote device connected to a port of a local device. In some embodiments, the discovery module 202 communicates with a discovery process to receive the original remote device ID and the original remote port ID. In some embodiments, the discovery process runs independently from the discovery module 202 and the discovery module 202 receives the device ID and port ID information from the discovery process. In other embodiments, the discovery module 202 controls the discovery process. In other embodiments, the discovery module 202 is integrated with the discovery process.

In some embodiments, the discovery module 202 correlates a local device ID and local port ID associated with the received remote device ID and remote port ID. In some embodiments, the discovery module 202 correlates a local device ID and local port ID associated with the received remote device ID and remote port ID by receiving the remote device ID and remote port ID over a cable between the port of the local device receiving the remote device ID and the remote port ID.

In some embodiments, an original remote device ID and an original remote port ID are a first remote device ID and an associated first remote port ID received at a startup, which are then stored by the pairing module 204. In other embodiments, the original remote device ID and the original remote device ID are merely remote device IDs and remote port IDs received and stored previous to receiving a new remote device ID and a new remote port ID. In some embodiments, the remote device ID and/or the local device ID are chassis IDs. In other embodiments, the remote device ID and/or the local device ID are other identifiers, such as a serial number, a universally unique identifier ("UUID"), or the like.

In some embodiments, the remote port ID is a port identifier of a port that transmits a discovery packet that is received at a port of the local device. The port ID of the remote port, in various embodiments, is a number, a name, or some other identifier that identifies which port of the remote device that transmitted the device ID and port ID. The port ID of the local device, in some embodiments, is a number, a name, or some other identifier that identifies which port of the local device received the remote device ID and remote port ID from the remote device.

The apparatus 200 includes a pairing module 204 configured to store the original remote device ID and the original remote port ID together with a local device ID and a local port ID of the port of the local device. In some embodiments, the pairing module 204 stores the original remote device ID and the original remote port ID together with the local device ID and the local port ID of the port of the local device in a database, a table, or similar data structure. In some embodiments, the pairing module 204 stores the original remote device ID and the original remote port ID together with the local device ID and the local port ID of the port of the local device on each local device. In other embodiments, the pairing module 204 stores the original remote device ID and the original remote port ID together with the local device ID and the local port ID of the port of the local device in a central location. The pairing module 204 stores the device ID and port ID information in non-volatile data storage (e.g., non-volatile computer readable storage media) accessible to the connection testing apparatus 102, such as a storage device 110 depicted in FIG. 1.

In some embodiments, the pairing module 204 stores the original remote device ID and the original remote port ID together with the local device ID and the local port ID of the port of the local device in response to a remote device ID and port ID not being previously stored for the local port of the local device where the remote device ID and port ID are received. In some examples, the pairing module 204 checks a line in a table, database, etc. with the local device ID and local port ID to determine if a remote device ID and remote port ID are stored.

In some embodiments, storing the local device ID is in terms of the local device ID being known based on where the pairing module 204 stores pairing information that includes the original remote device ID and the original remote port ID together with the local port ID. For example, the pairing module 204 may store the pairing information on the local device so the local device ID is known by default. In other embodiments, the pairing module stored pairing information in a table, database, etc. identified with the local device ID so that the local device ID is associated with the pairing information. In other embodiments, the pairing module 204 stores the pairing information that includes and entry for the local device ID, which may occur for a central storage location of the pairing information of several local devices, for when the pairing module 204 is operating on the management server 118, etc. As used herein the pairing module 204 storing the local device ID includes any scenario where the local device ID is known for a corresponding local port ID.

The discovery module 202 is also configured to receive, from the discovery process, a new remote device ID and a new remote port ID for a remote device connected to the port of the local device. In some embodiments, the local device receives the new remote device ID and the new remoted port ID over the same connection that the local device received the original remote device ID and the original remoted port ID. In some embodiments, the discovery module 202 receives a new remote device ID and port ID on a periodic basis, such as every time the discovery process advertises the device ID and port ID of the remote device.

The apparatus 200 includes a comparison module 206 configured to compare the original remote device ID and the original remote port ID with the new remote device ID and the new remote port ID and an alarm module 208 configured to, in response to the original remote device ID and the original remote port ID not matching the new remote device ID and the new remote port ID, send a mismatch alarm. In some embodiments, the comparison module 206 or the discovery module 202 determines which port of the local device received the new remote device ID and port ID and the comparison module 206 accesses the stored original remote device ID and port ID based on the port of the local device that received the new remote device ID and port ID.

In some embodiments, comparing the original remote device ID and the original remote port ID with the new remote device ID and the new remote port ID includes comparing the original remote device ID with the new remote device ID and comparing the original remote port ID with the new remote port ID and the alarm module 208 sends a mismatch alarm in response to either the new remote device ID not matching the original remote device ID or the new remote port ID not matching the original remote port ID.

In some embodiments, the mismatch alarm includes the local device ID and the local port ID. In other embodiments, the mismatch alarm includes the original remote device ID and the new remote device ID and/or the original remote port ID and the new remote port ID. The mismatch alarm, in some embodiments, includes information useful in determining which cable is connected in a wrong spot or is disconnected. In some embodiments, the mismatch alarm includes textual information. In other embodiments, the mismatch alarm includes a depiction of which cable is connected in a wrong spot and/or is disconnected, or other useful information in a graphical format. In some embodiments, the mismatch alarm is coded in a way to provide information to another module, system, etc. to take an action. One of skill in the art will recognize other ways to configure the mismatch alarm.

In some embodiments, each time the discovery module 202 receives a new remote device ID and corresponding port ID, the comparison module 206 compares the new remote device ID and port ID with the original remote device ID and port ID and the alarm module 208 sends a mismatch alarm in response to the new remote device ID not matching the original remote device ID and/or the new remote port ID not matching the original remote port ID.

Figure 3:
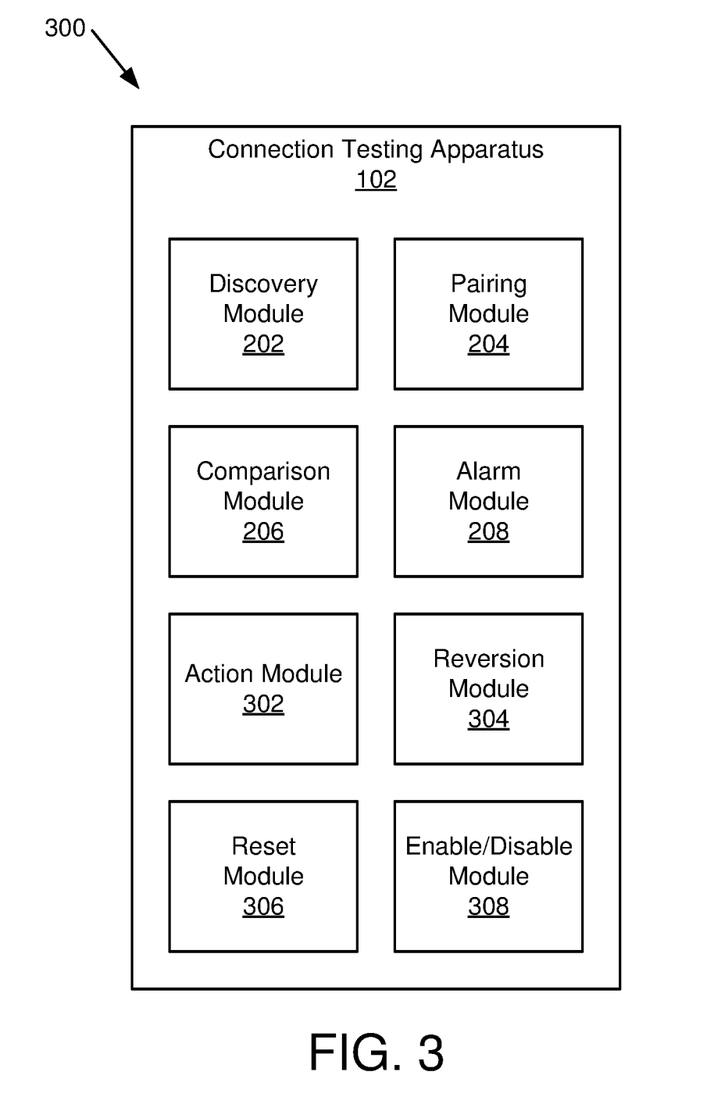
FIG. 3 is a schematic block diagram illustrating another apparatus for detecting network mis-cabling, according to various embodiments.

FIG. 3 is a schematic block diagram illustrating another apparatus 300 for detecting network mis-cabling, according to various embodiments. The apparatus 300 includes another connection testing apparatus 102 with a discovery module 202, a pairing module 204, a comparison module 206, and an alarm module 208 which are substantially similar to those described above in relation to the apparatus 200 of FIG. 2. In various embodiments, the apparatus 300 includes one or more of an action module 302, a reversion module 304, a reset module 306, and/or an enable/disable module 308, which are described below. In various embodiments, all or a portion of the apparatus 300 is implemented similarly to the apparatus 200 of FIG. 2.

In some embodiments, the discovery module 202 receives from the discovery process more information and/or different information than the remote device ID and remote port ID. In various embodiments, the discovery module 202 receives a transceiver serial number, a cable length, a link speed, a media type, a link type, such as single port versus port-channel, or other relevant information transmitted by a remote device, such as port virtual local area network ("VLAN") assignment. In the embodiments, the paring module 204 stores the any or all of the information from the discovery service and the comparison module 206 compares saved original remote device information with new remote device information and the alarm module 208 sends a mismatch alarm if some or all of the information does not match.

In some embodiments, various bits of discovery information received by the discovery module 202 has different values and/or mean different things. For example, while a remote device ID mismatch identifies that a different remote device is attached to the link of the local port, a link speed, a port VLAN assignment mismatch may indicate a configuration change where the link may still be available. The alarm module 208, in various mismatch scenarios, sends out different mismatch alarms. One of skill in the art will recognize alarm types based on which bits of information received by the discovery module 202 are identified as a mismatch.

The apparatus 300 includes, in some embodiments, an action module 302 configured to initiate an action in response to the mismatch alarm. In some embodiments, the action is includes disabling the local port of the local device that received the new remote device ID and port ID. In other embodiments, the action includes disabling the port of the remote device that transmitted the new remote device ID and port ID.

In the embodiments, the apparatus 300 is executing on or has access to a management server 118 to access the remote port. In some embodiments, the action module 302 disabling a port includes various ways to re-enable the link between the local port of the local device to the remote port of the remote device. In some examples, the action module 302 error-disables a port which periodically enables the error-disabled port to check if the condition that caused the disablement persists, such as the comparison module 206 determining that a new remote device ID/port ID does not match the original remoted device ID/port ID. In other embodiments, the action module 302 temporarily disables a port until a next time a link is detected, for example for a link using a transceiver. In other embodiments, the action module 302 logically disables a port by applying an Access Control List ("ACL") that discards data traffic from the port except for protocol or control traffic to be received by the device with the logically disabled port, which would allow a local device to receive updates from a remote device. In other embodiments, the action module 302 disables a port by assigning the port to a virtual local area network ("VLAN") that limits access that the disabled port has to information being transmitted through the device with the disabled port. In some embodiments, the action module 302 uses the original remote device ID and port ID, the new remote device ID and port ID, the local device ID and port ID, information about the local device, information about the remote device, and other useful information to take various actions.

For example, the new remote device ID may match the original remote device ID while the new remote port ID may be for a port different than the original remote port ID so the action module 302 determines that a cable between the original port of the remote device is plugged into a new port of the remote device and sends an appropriate message. In another example, information in the mismatch alarm may indicate that both the new remote device ID and the new remote port ID do not match the original remote device ID and the original remote port ID and the action module 302 then sends a message to a user asking if the remote device has been replaced. If the user responds affirmatively, the action module 302 directs the pairing module 204 to replace the original remote device ID and port ID with the new remote device ID and port ID, which then become the original remote device ID and port ID for future comparisons by the comparison module 206. One of skill in the art will recognize other actions for the action module 302 based on the mismatch alarm.

The apparatus 300, in some embodiments, includes a reversion module 304 configured to revert an action taken previously in response to the comparison module 206 determining that the original remote device ID and the original remote port ID matches the new remote device ID and the new remote port ID. For example, the action module 302 may have previously disabled the local port of the local device and possibly the remote port of the remote device in response to a mismatch alarm and the reversion module 304 enables the local port and/or the remote port in response to the comparison module 206 determining that the original remote device ID and the original remote port ID matches the new remote device ID and the new remote port ID. One of skill in the art will recognize other actions to revert in response to the comparison module 206 determining that the original remote device ID and the original remote port ID matches the new remote device ID and the new remote port ID.

The apparatus 300, in some embodiments, includes a reset module 306 configured to clear the original remote device ID and the original remote port ID for one or more local device IDs and associated local port IDs. In some embodiments, the reset module 306 clears the remote device IDs and port IDs based on a user command, a system restart, a system reconfiguration, or other event where rebuilding a database, table, etc. storing pairs of original remote device IDs and port IDs each paired with a local device ID and port ID would be useful.

The apparatus 300, in some embodiments, includes an enable/disable module 308 configured to enable or disable the matching process of the connection testing apparatus 102, for example by user command. In some embodiments, the enable/disable module 308 enables storage of an original remote device ID and an original remote port ID together with a local device ID and a local port ID in response to determining that storage of a remote device ID and corresponding remote port ID for the port of the local device is enabled and the pairing module 204 determining that a remote device ID and a remote port ID is not previously stored for the local device ID and the local port ID of the port of the local device. In various embodiments, the enable/disable module 308 enables storing of remote device IDs and port IDs based on user input, input from an application, or other mechanism. In some embodiments, the enable/disable module 308 also enables or disables the comparison module 206, the alarm module 208, the action module 304, the reset module 306, etc.

In some embodiments, the enable/disable module 308 is configured to disable storage of a remote device ID and port ID, which may be initiated by user input, input from an application, etc. In response to the enable/disable module 308 disabling storage of a remote device ID and port ID, in some embodiments, the reset module 306 clears the original remote device ID and the original remote port ID for one or more local device IDs and associated local port IDs, the comparison module 206 stops comparing new and the original remote device IDs and port IDs, and/or the reversion module 304 reverts one or more actions taken by the action module 302. One of skill in the art will recognize other actions to take in response to the enable/disable module 308 disabling storage of remote device IDs and port IDs.

Figure 4:
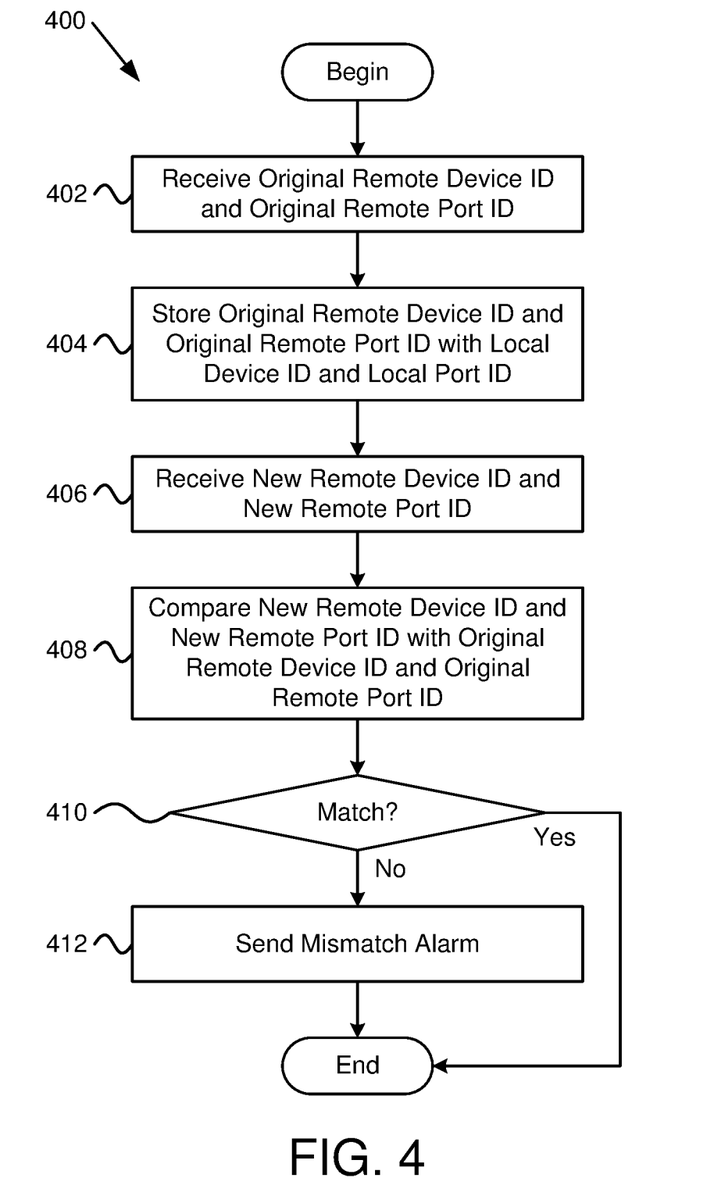
FIG. 4 is a schematic flow chart diagram illustrating a method for detecting network mis-cabling, according to various embodiments.

FIG. 4 is a schematic flow chart diagram illustrating a method 400 for detecting network mis-cabling, according to various embodiments. The method 400 begins and receives 402, from a discovery process using a discovery protocol, an original remote device ID and an original remote port ID of a port of a remote device connected to a port of a local device. The method 400 stores 404 the original remote device ID and the original remote port ID together with a local device ID and a local port ID of the port of the local device.

The method 400 receives 406, from the discovery process, a new remote device ID and a new remote port ID for a remote device connected to the port of the local device, compares 408 the original remote device ID and the original remote port ID with the new remote device ID and the new remote port ID, and determines 410 if the original remote device ID and the original remote port ID match the new remote device ID and the new remote port ID. If the method 400 determines 410 that the original remote device ID and the original remote port ID match the new remote device ID and the new remote port ID, the method 400 ends. If the method 400 determines 410 that the original remote device ID and the original remote port ID do not match the new remote device ID and the new remote port ID, the method 400 sends 412 a mismatch alarm and the method 400 ends. In various embodiments, all or a portion of the method 400 is implemented with the discovery module 202, the pairing module 204, the comparison module 206 and/or the alarm module 208.

Figure 5:
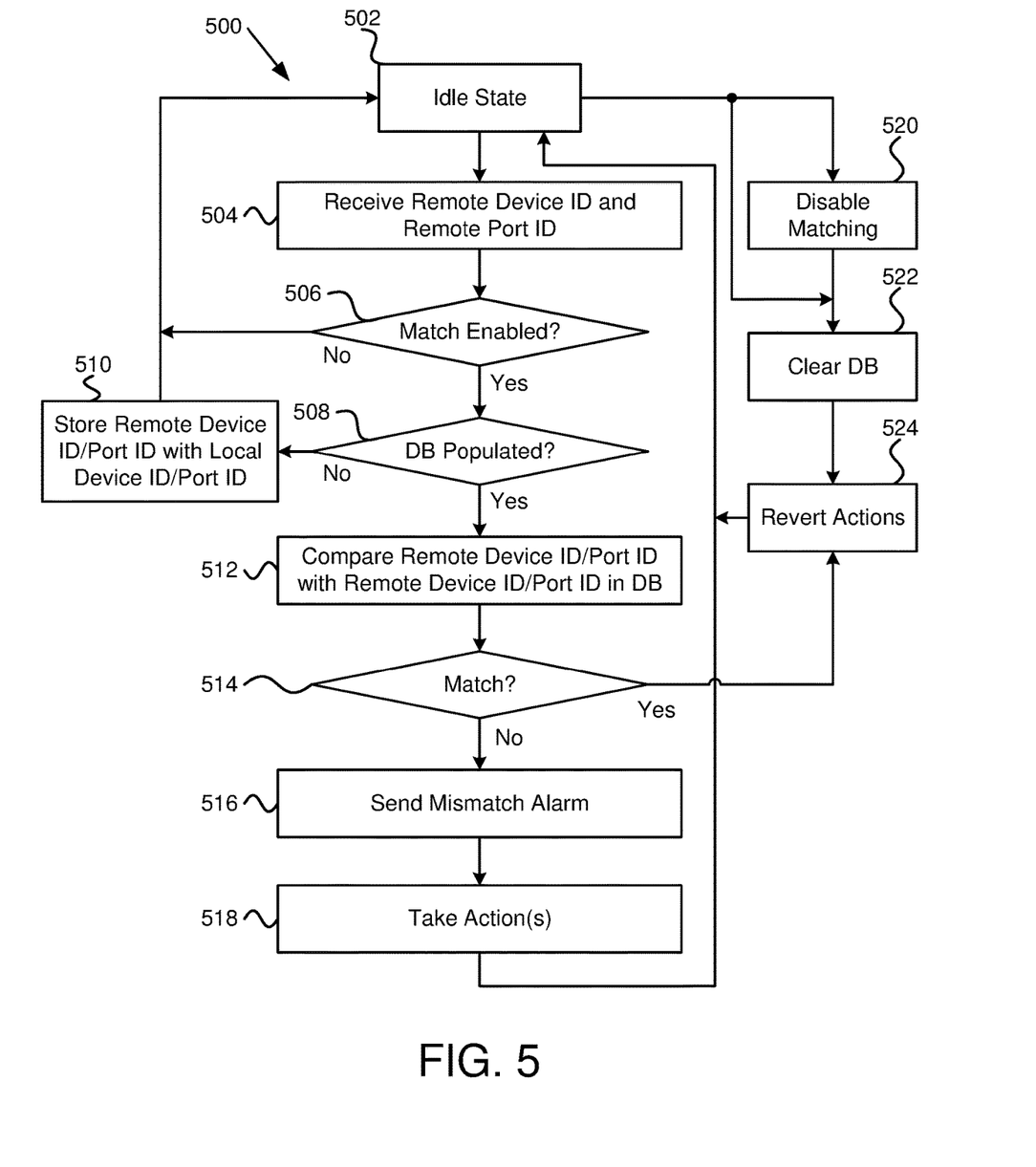
FIG. 5 is a schematic flow chart diagram illustrating another method for detecting network mis-cabling, according to various embodiments.

FIG. 5 is a schematic flow chart diagram illustrating another method 500 for detecting network mis-cabling, according to various embodiments. The method 500 begins in an idle state 502 and receives 504, from a discovery process using a discovery protocol, an original remote device ID and an original remote port ID of a port of a remote device connected to a port of a local device. The method 500 determines 506 whether a matching service that compares new and original remote device IDs and port IDs is enabled. If the method 500 determines 506 that the matching service is not enabled, the method 500 returns to the idle state 502. If the method 500 determines 506 that the matching service is enabled, the method 500 determines 508 if a database (or other data structure) is populated for the local device ID and local port ID where the remote device ID and remote port ID were received.

If the method 500 determines 508 that the database is not populated the local device ID and local port ID where the remote device ID and remote port ID were received, the method 500 stores 510 the received remote device ID and the remote port ID together with the local device ID and the local port ID and returns to the idle state 502. If the method 500 determines 508 that the database is populated the local device ID and local port ID where the remote device ID and remote port ID were received (e.g., original remote device ID and port ID), the method 500 compares 512 the newly received remote device ID and remote port ID with the stored remote device ID and remoted port ID and determines 514 if there is a match.

If the method 500 determines 514 that there is not a match between either the receive remote device ID and the stored remote device ID or the received remote port ID and the stored port ID, the method 500 sends 516 a mismatch alarm and takes 518 action based on the mismatch alarm and returns to the idle state 502. If the method 500 determines 514 that there is a match between the receive remote device ID and the stored remote device ID and between the received remote port ID and the stored port ID, the method 500 reverts 524 any action taken based on any mismatch and returns to the idle state 502, such as disabling a port.

The method 500 may disable 520 at some point the matching service, for example based on a command from a user, and in response the method 500 clears 522 the database of remote device IDs and port IDs and may also clear the database of local device IDs and port IDs, and then the method 500 reverts 524 any actions taken previously, like disabling a port, and the method 500 returns to the idle state 502. In other embodiments, the method 500 clears 522 the database while the matching service remains enabled. For example, the method 500 may clear the database upon startup, after a reconfiguration, or other event where clearing the database is beneficial. In response to clearing the database, the method 500 also reverts 524 previous actions, if any, and returns to the idle state 502. In various embodiments, all or a portion of the method 500 is implemented with the discovery module 202, the pairing module 204, the comparison module 206, the alarm module 208, the action module 302, the reversion module 304, the reset module 306, and/or the enable/disable module 308.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, from a discovery process using a discovery protocol, an original remote device identifier ("ID") and an original remote port ID of a port of a remote device connected to a port of a local device;
storing the original remote device ID and the original remote port ID together with a local device ID and a local port ID of the port of the local device;
receiving, from the discovery process, a new remote device ID and a new remote port ID for a remote device connected to the port of the local device;
comparing the original remote device ID and the original remote port ID with the new remote device ID and the new remote port ID; and
in response to the original remote device ID and the original remote port ID not matching the new remote device ID and the new remote port ID, sending a mismatch alarm.

2. The method of claim 1, further comprising, on a periodic basis:
receiving, from the discovery process, a new remote device ID and a new remote port ID for a remote device connected to the port of the local device;
comparing the original remote device ID and the original remote port ID with the new remote device ID and the new remote port ID; and
in response to determining that the original remote device ID and the original remote port ID not matching the new remote device ID and the new remote port ID, sending a mismatch alarm.

3. The method of claim 1, wherein storing the original remote device ID and the original remote port ID together with a local device ID and a local port ID of the port of the local device is in response to determining that a remote device ID and a remote port ID is not stored for the local device ID and the local port ID of the port of the local device.

4. The method of claim 3, wherein storing the original remote device ID and the original remote port ID together with a local device ID and a local port ID of the port of the local device is further in response to determining that storage of a remote device ID and corresponding remote port ID for the port of the local device is enabled.

5. The method of claim 1, further comprising initiating an action in response to the mismatch alarm.

6. The method of claim 5, wherein the action comprises disabling one or more of the local port and the remote port.

7. The method of claim 1, further comprising reverting an action taken previously in response to determining that the original remote device ID and the original remote port ID match the new remote device ID and the new remote port ID.

8. The method of claim 1, further comprising clearing storage of the original remote device ID and the original remote port ID together with a local device ID and a local port ID of the port of the local device in response to disabling storage of a remote device ID and corresponding remote port ID for the port of the local device.

9. The method of claim 1, wherein:
the discovery process comprises a link layer discovery protocol ("LLDP");
the original remote device ID, the new remote device ID and the local device ID each comprise a chassis ID type, length, and value ("TLV"); and/or
the original remote port ID, the new remote port ID and the local port ID each comprise a port ID TLV.

10. An apparatus comprising:
a processor; and
non-transitory computer readable storage media storing code, the code being executable by the processor to perform operations comprising:
receiving, from a discovery process implemented using a discovery protocol, an original remote device identifier ("ID") and an original remote port ID of a port of a remote device connected to a port of a local device;
storing the original remote device ID and the original remote port ID together with a local device ID and a local port ID of the port of the local device;
receiving, from the discovery process, a new remote device ID and a new remote port ID for a remote device connected to the port of the local device;
comparing the original remote device ID and the original remote port ID with the new remote device ID and the new remote port ID; and
in response to the original remote device ID and the original remote port ID not matching the new remote device ID and the new remote port ID, sending a mismatch alarm.

11. The apparatus of claim 10, the operations further comprising, on a periodic basis:
receiving, from the discovery process, a new remote device ID and a new remote port ID for a remote device connected to the port of the local device;
comparing the original remote device ID and the original remote port ID with the new remote device ID and the new remote port ID; and
in response to determining that the original remote device ID and the original remote port ID not matching the new remote device ID and the new remote port ID, sending a mismatch alarm.

12. The apparatus of claim 10, wherein storing the original remote device ID and the original remote port ID together with a local device ID and a local port ID of the port of the local device is in response to determining that a remote device ID and a remote port ID is not stored for the local device ID and the local port ID of the port of the local device.

13. The apparatus of claim 10, the operations further comprising initiating an action in response to the mismatch alarm.

14. The apparatus of claim 10, the operations further comprising reverting an action taken previously in response to determining that the original remote device ID and the original remote port ID match the new remote device ID and the new remote port ID.

15. The apparatus of claim 10, wherein:
the discovery process comprises a link layer discovery protocol ("LLDP");
the original remote device ID, the new remote device ID and the local device ID each comprise a chassis ID type, length, and value ("TLV"); and/or
the original remote port ID, the new remote port ID and the local port ID each comprise a port ID TLV.

16. A program product comprising a non-transitory computer readable storage medium storing code, the code being configured to be executable by a processor to perform operations comprising:
- receiving, from a discovery process implemented using discovery process, an original remote device identifier ("ID") and an original remote port ID of a port of a remote device connected to a port of a local device;
- storing the original remote device ID and the original remote port ID together with a local device ID and a local port ID of the port of the local device;
- receiving, from the discovery process, a new remote device ID and a new remote port ID for a remote device connected to the port of the local device;
- comparing the original remote device ID and the original remote port ID with the new remote device ID and the new remote port ID; and
- in response to the original remote device ID and the original remote port ID not matching the new remote device ID and the new remote port ID, sending a mismatch alarm.

17. The program product of claim 16, the operations further comprising, on a periodic basis:
- receiving, from the discovery process, a new remote device ID and a new remote port ID for a remote device connected to the port of the local device;
- comparing the original remote device ID and the original remote port ID with the new remote device ID and the new remote port ID; and
- in response to determining that the original remote device ID and the original remote port ID not matching the new remote device ID and the new remote port ID, sending a mismatch alarm.

18. The program product of claim 16, wherein storing the original remote device ID and the original remote port ID together with a local device ID and a local port ID of the port of the local device is in response to determining that a remote device ID and a remote port ID is not stored for the local device ID and the local port ID of the port of the local device.

19. The program product of claim 16, the operations further comprising initiating an action in response to the mismatch alarm.

20. The program product of claim 16, the operations further comprising reverting an action taken previously in response to determining that the original remote device ID and the original remote port ID match the new remote device ID and the new remote port ID.

\* \* \* \* \*